United States Patent [19]

Brodowski

[11] Patent Number: 4,841,014
[45] Date of Patent: Jun. 20, 1989

[54] MELT-PROCESSABLE, THERMOTROPIC, FULLY AROMATIC POLYESTERS

[75] Inventor: Walter Brodowski, Amorbach, Fed. Rep. of Germany

[73] Assignee: Akzo N.V., Arnhem, Netherlands

[21] Appl. No.: 210,428

[22] Filed: Jun. 23, 1988

[30] Foreign Application Priority Data

Jun. 27, 1987 [DE] Fed. Rep. of Germany ....... 3721256

[51] Int. Cl.$^4$ .................. G08G 63/18; G08G 63/68
[52] U.S. Cl. .................................. 528/191; 528/193; 528/194; 528/271
[58] Field of Search ............... 528/191, 193, 194, 271

[56] References Cited

U.S. PATENT DOCUMENTS

| | | | |
|---|---|---|---|
| 3,637,595 | 1/1972 | Cottis et al. | 528/193 |
| 3,786,022 | 1/1974 | Hata et al. | 528/182 |
| 3,980,749 | 9/1976 | Cottis et al. | 264/331 |
| 4,065,432 | 12/1977 | Frazer | 528/190 |
| 4,238,598 | 12/1980 | Favstritsky | 528/193 |
| 4,256,624 | 3/1981 | Calundann | 524/599 |
| 4,265,802 | 5/1981 | Choe | 524/604 |
| 4,433,132 | 2/1984 | Rogers et al. | 528/191 |
| 4,536,561 | 8/1985 | Schmidt et al. | 528/191 |
| 4,617,370 | 10/1986 | Lenz et al. | 528/191 |

FOREIGN PATENT DOCUMENTS

| | | |
|---|---|---|
| 0095938 | 12/1983 | European Pat. Off. |
| 0134956 | 7/1984 | European Pat. Off. |
| 0187734 | 7/1986 | European Pat. Off. |
| 2025971 | 8/1985 | Fed. Rep. of Germany |

OTHER PUBLICATIONS

Beilsteins Handbuch der Organischen Chemie, 4. Aufl., 6. Band, 1965, Springer-Verlag, p. 992.

*Primary Examiner*—John Kight
*Assistant Examiner*—T. Mason
*Attorney, Agent, or Firm*—Oliff & Berridge

[57] ABSTRACT

Thermotropic, fully aromatic polyesters, which consist essentially of
(a) repeating units of the formula

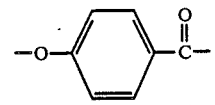

in proportions of 20 to 70 mole percent,
(b) units of the formula

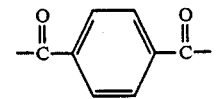

in proportions of 10 to 40 mole percent,
(c) one or both units of the formula

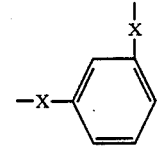

wherein X=C=O or —O—, in proportions of 0 to 15 mole percent,
(d) units of the formula(s)

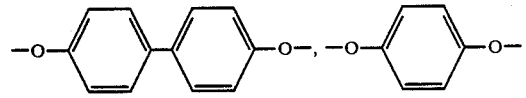

in proportions of 0 to 33 mole percent, and
(e) units of the formula

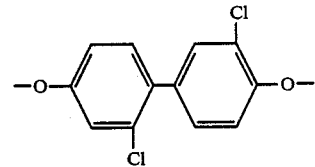

in proportions of 2 to 40 mole percent, have high Vicat B temperatures and can be thermoplastically processed at temperatures below 400° C.

13 Claims, No Drawings

MELT-PROCESSABLE, THERMOTROPIC, FULLY AROMATIC POLYESTERS

TECHNICAL FIELD

The invention relates to melt-processable, thermotropic, fully aromatic polyesters, a process for synthesis of these polyesters and their use for the production of shaped articles.

BACKGROUND

Thermotropic, fully aromatic polyesters based on p moles of p-hydroxybenzoic acid, q moles of terephthalic acid or isophthalic acid and r moles of diphenols, such as hydroquinone or 4,4'-dihydroxydiphenyl, are known from West German Laid-open Application 2,205,971. The conditions of q:r=10:15 to 15:10, p:q=1:100 to 100:1 and p+q+r=3 to 600 are valid in this application. These polyesters can be readily processed only if terephthalic acid is largely replaced by the crystallinity-disturbing isophthalic acid, which leads, however, to a not inconsiderable deterioration of some important mechanical and thermal properties.

According to European Pat. No. 134,956, thermotropic, fully aromatic polyesters on the basis of (a) p-hydroxybenzoic acid, (b) iso- and if necessary terephthalic acid, (c) hydroquinone and (d) 3,4'- and/or 4,4'-dihydroxydiphenyl, 3,4'- and/or 4,4'-dihydroxydiphenyl ether and/or 3,4'- and/or 4,4'-dihydroxydiphenyl sulfide are known, the molar ratio of the condensed groups a:b being equal to 80:20 to 50:50, the molar ratio of the condensed groups b:c:d being equal to 20:10:10 to 50:48:2, the molar ratio of the condensed groups b:(c+d) being equal to 0.95 to 1.05 and the terephthalic acid proportion of component (b) amounting to as much as 50 mole %. However, the Vicat B temperatures of the described mixed polyesters lie at the relatively low level of 128° to 145° C. and their usability is limited.

An object of the present invention is to provide thermotropic, fully aromatic polyesters of the highest possible high-temperature shape stability, which can be thermoplastically processed below 400° C. to shaped articles with excellent mechanical properties.

SUMMARY OF THE INVENTION

The preferred new thermotropic, fully aromatic polyesters have a Vicat B softening temperature which preferably lies in the range of 150° to 250° C. Moreover, these polyesters have a notch impact toughness of 10–25 kN/m and more, flexural moduli of 10–15 GPa and higher and flexural strengths of 100 to 250 MPa or more.

Unexpectedly, it has been found that fully aromatic polyesters which contain condensed groups of p-hydroxybenzoic acid, terephthalic acid and, if necesssary, isophthalic acid and/or resorcinal, 4,4'-dihydroxydiphenyl and/or hydroquinone and, as a further diphenol component, 3,3'-dichloro-4,4'-dihydroxydiphenyl, possess the desired combination of the above-mentioned advantageous properties if specified molar percentages of the said constituents are maintained.

DETAILED DESCRIPTION OF PREFERRED EMBODIMENTS OF THE INVENTION

The polyesters of the invention are melt-processable, thermotropic, fully aromatic polyesters, which consist essentially of (a) repeating units of the formula

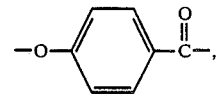

in proportions of 20 to 70 mole percent
(b) units of the formula

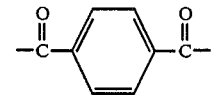

in proportions of 10 to 40 mole percent
(c) one or both units of the formula

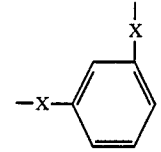

wherein $$X = \begin{matrix} \diagdown \\ / \end{matrix} C=O$$

or —O—, in proportions of 0 to 15 mole percent,
(d) units of the formula(s)

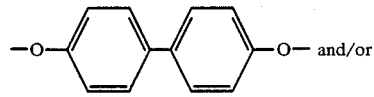

in proportions of 0 to 33 mole percent, and
(e) units of the formula

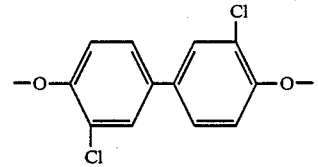

in proportions of 2 to 40 mole percent.

In the polyesters according to the invention, the repeating units of formulas (a) to (e) are preferably present in statistical distribution. Nevertheless, according to the invention, segments or blocks of the repeating units are not excluded, although it is to be noted that relatively long blocks of the p-hydroxybenzoic acid units can greatly increase the melting point and the melt viscosity.

The preferred polyesters according to the invention are characterized by the fact that they consist of the condensed group (a) in proportions of 40 to 60 mole percent, of the condensed group (b) in proportions of 15 to 20 mole percent, of one or both of the condensed groups (c) in proportions of 4 to 6 mole percent, of one or both of the condensed groups (d) in proportions of 5 to 17 mole percent, and of the condensed group (e) in proportions of 3 to 15 mole percent.

As terminal groups, the polyesters according to the invention can contain —COOH, —OH, acyloxy and groups resulting from chain-terminating agents. Suitable chain-terminating agents include monofunctional aromatic hydroxy compounds such as 4-hydroxydiphenyl and p-nonylphenol, and aromatic monocarboxylic acids such as benzoic acid and diphenylcarboxylic acids, in proportions of 0.5 to 5 mole % relative to diphenols or dicarboxylic acids.

The polyesters according to the invention can be synthesized by various processes, in a manner known per se, e.g., by reaction of the acid and phenol components or transesterification of the reactive derivatives of the compounds (a) to (e) (e.g., their esters or acid chlorides), and subsequent polycondensation, which is carried out if necessary in the presence of chain-terminating agents and/or catalysts. Suitable starting compounds therefore include, in particular, aryl esters, acyl esters and acid chlorides. The 3,3'-dichloro-4,4'-dihydroxydiphenyl component can in addition contain as much as 10 weight percent, preferably as much as 5 weight percent, of trichloro- and monochlorodiphenol resulting from the synthesis.

In a preferred synthesis process, the lower $C_1$ to $C_4$ acyl derivatives, preferably the acetates, of p-hydroxybenzoic acid, of 4,4'-dihydroxydiphenyl and/or hydroquinone, of 3,3'-dichloro-4,4'-dihydroxydiphenyl and, if necessary, of resorcinol are reacted with terephthalic acid and, if necessary, isophthalic acid. In this connection, the lower acyl esters can preferably also be synthesized in situ. The acetates of the phenolic compounds are preferred.

The reaction is generally performed in the temperature range of 250° to 385° C., if necessary under reduced pressure and in the presence of chain-terminating agents and catalysts. The reaction is usually initiated at low temperature, and the temperature is raised continuously as polycondensation proceeds. As the rate of reaction decreases, it is recommended that a vacuum be applied, starting from normal pressure and preferably being continuously increased to about 0.1 mbar.

It can be advisable to charge the diol components in an excess of 1 to 5 mole %, since corresponding losses due to sublimation can occur during the polycondensation. The starting components are therefore preferably charged in such proportions that the carboxyl components are present in a molar ratio of 0.98 to 1.02 relative to the hydroxy components. The reactions can be performed both in the melt and in liquid heat-conducting media, e.g., the eutectic mixture of diphenyl oxide and diphenyl. The acidolysis process in the melt is generally preferred.

The transesterification reactions and also the polycondensation reactions can be catalytically accelerated in known ways. Suitable catalysts for the polycondensation include, e.g., Lewis acids such as $BF_3$ and hydrohalic acids such as HCl, dialkyl- and diaryltin oxides; dibutyltin diacetate, dibutyldimethoxytin, alkoxytitanium silicates, titanium alkoxides; magnesium, manganese(II), iron(II), sodium, potassium and zinc acetate; alkali metal and alkaline earth salts, such as phosphates, carboxylic acid slats; magnesium acetylacetonate, zinc acetylacetonate; complex salts or mixed salts of the subgroup elements, e.g., vanadium, titanium, manganese, cobalt, nickel, zinc, lanthanum, cerium, zirconium, or of the elements of other groups of the periodic table, e.g., germanium, tin, lead and antimony. Preferably the catalyst quantities amount of 0.01 to 0.2 weight percent relative to the total weight of the charged monomers.

The polyesters according to the invention can, if desired, be subsequently subjected to a solid-phase postcondensation under reduced pressure at temperatures of 220° to 320° C. Depending on the chosen temperature, the molecular weight in this case further increases within 1 to 28 hours, resulting in polyesters with appreciably improved mechanical and thermal properties.

Because of their relatively low melt viscosity, the thermotropic polyesters according to the invention can be processed, preferably from the melt, to obtain injection-molded articles, filaments, fibers, tapes and films. For this purpose the standard processing methods are suitable, such as injection molding, extrusion, pressing and melt spinning. The shear forces occurring therein induce a molecular orientation, which is influenced to a high degree by the strength of the shear forces. The melt viscosity of the polyester decreases rapidly with an increase in the shear forces, thus indicating pronounced structure viscosity.

The shaped articles manufactured from polyesters according to the invention are characterized by high tensile strengths, flexural strengths, flexural moduli, notch impact strengths and, in particular, high Vicat B softening temperatures. Since they are also extremely chemical-resistant and flame-retardant, and therefore have great dimensional stability, they are preferentially suitable for the manufacture of electrotechnical articles, such as insulators, printed circuits, encapsulations of integrated circuits, parts of fittings;

parts of equipment for chemical engineering, such as pipes, vessel linings, rotors, seals, sliding bearings;

parts of the inside furnishings of aircraft and parts of devices for medical technology, e.g., components of air-conditioning systems, valve parts.

The polyesters according to the invention can also be used as covering and coating material, as well as for the manufacture of reinforced or filled molding compounds. In the last-mentioned form of application, the content of reinforcing or filler material can amount to 5 to 65 weight percent, relative to the reinforced or filled molding compound.

The viscosities cited in the following examples were determined as follows:

The relative solution viscosities were measured on 0.1% solutions of the polymers in pentafluorophenol at 60° C. by means of capillary viscosimeter, and from these results the inherent viscosities were calculated according to the following equation, wherein C represents the solution concentration in g/100 cm$^3$:

$$\eta_{inh} = \frac{\ln \eta rel.}{C} \quad \frac{dl}{g}$$

The thermotropic nature of the melts was checked up to 420° C. under the polarizing microscope.

The polymer melting temperatures were measured by heating ground samples on a slide on a preheated heating plate for 5 minutes (in order to avoid post-condensation reactions) and then examining for changes under an optical microscope. The melting range was defined as the temperature interval in which distinct melting of the fibrous polymer particles was observed.

The injection-molding tests were performed on an Arburg injection-molding machine, model Allrounder 270-210-500. The adjusted mold temperature was 100° C. unless otherwise indicated.

The flexural strengths were measured in accordance with 53452 and the flexural moduli in accordance with DIN 53457. The notch impact toughness was determined on the standard small bar in accordance with DIN 53453, and the Vicat B softening temperatures were determined in accordance with DIN 53460 on test plates which preferably had been preheated.

The material components used are abbreviated as follows in the examples:
PHB=p-hydroxybenzoic acid
TPA=terephthalic acid
IPA=isophthalic acid
RC=resorcinol
DP=4,4'-dihydroxydiphenyl
HQ=hydroquinone
ClDP=3,3'-dichloro-4,4'-dihydroxydiphenyl
EA=acetic anhydride

EXAMPLE OF SYNTHESIS OF 3,3'-DICHLORO-4,4'-DIHYDROXYDIPHENYL (ClDP)

100 g (0.537 mole) of 97% 4,4'-dihydroxydiphenyl was slurried in 400 ml of ethyl acetate and cooled to 4° C., and 151 g (1.12 mole) of sulfuryl chloride was slowly added dropwise with stirring within about 3 to 3.5 hours in such a manner that the temperature of the reaction mixture did not rise above 6° C. Thereafter stirring was continued overnight at room temperature. After evaporative concentration of the yellowish solution to dryness, the obtained light-gray crystalline mass was reduced to small particles and post-dried in the vacuum drying oven at 80° C. The raw product consisted of 3,3'-dichloro-4,4'-dihydroxy-diphenyl in a proportion of 91 weight percent, trichlorobiphenol in a proportion of 4 weight percent and monochlorobiphenol in a proportion of 2.5 weight percent. The melting range was 128° to 132° C.

After purification by vacuum distillation, a white crystalline mass was obtained in about 95% yield, with a content of 3,3'-dichloro-4,4'-dihydroxydiphenyl of 92–98%.

EXAMPLE 1

Molar Ratio (=MR) of
PHB:TPA:ClDP:DP=0.6:0.2:0.03:0.17

In a 1.3 liter reactor of Hastelloy B with anchor stirrer, the above-mentioned substances were placed in the following quantities:
p-hydroxybenzoic acid: 284.8 g (1.8 mole)
terephthalic acid: 99.7 g (0.6 mole)
3,3'-dichloro-4,4'-dihydroxydiphenyl, distilled: 23.0 g (0.09 mole)
4,4'-dihydroxydiphenyl: 95.1 g (0.515 mole)

The 1 to 5 mole % excess of a diol component, also added in the following examples, serves to compensate for losses due to sublimation during the polycondensation.

The oxygen was then removed from the reactor by evacuating 3 times (<5 torr) and re-aerating with nitrogen, 321.6 g (3.15 mole) of acetic anhydride was added, and the contents were boiled for 1 hour under reflux and with stirring. Thereafter, by continuously raising the temperature to 365° C. (internal temperature), 361 g (96% of the theoretically expected quantity) of acetic acid was distilled off within 90 minutes, after which further condensation took place under a vacuum of 100 torr until the resistance to stirring sharply increased (8 minutes). The final temperature was 383° C. and the total yield of distillate was 98%. The polymer mass was removed in the hot condition from the reactor and, after cooling, was reduced to small particles by cutting and grinding. The inherent viscosity measured on a 0.1% solution in pentafluorophenol was 7.0 dl/g. The polymer was injection-molded at 388° C. (highest value of the adjusted temperature profile) to form 2 and 6 mm thick test plates. The thermal and mechanical properties are presented in Tables 1 and 2.

| EXAMPLE 2: |  |
| --- | --- |
| MR of PHB:TPA:ClDP:DP = 0.6:0.2:0.05:0.15 | |
| PHB | 248.8 g (1.8 mole) |
| TPA | 99.7 g (0.6 mole) |
| ClDP, distilled | 38.3 g (0.15 mole) |
| DP | 86.3 g (0.464 mole) |
| EA | 321.6 g (3.15 mole) |

The reaction was carried out in a manner analogous to that of Example 1. The inherent solution viscosity of several batches was 7 to 7.2 dl/g. The polymer was injection-molded at 360° C. to obtain test pieces with very smooth surfaces.

| EXAMPLE 3: | | |
| --- | --- | --- |
| | | MR |
| PHB | 248.8 g (1.8 mole) | 60 |
| TPA | 99.7 g (0.6 mole) | 20 |
| ClDP | 76.6 g (0.3 mole) | 10 |
| DP | 57.5 g (0.309 mole) | 10 |
| EA | 321.6 g (3.15 mole) | |

The procedure was analogous to that of Example 1, with the following differences: distillation/condensation time until application of the vacuum was 110 minutes, internal temperature was 373° C.

$\eta_{inh}$ (several batches)=6 to 6.6 dl/g

The polymer was processed by injection molding at 321° C. to obtain test pieces (see Tables 1 and 2).

| EXAMPLE 4: | | |
| --- | --- | --- |
| | | MR |
| PHB | 248.8 g (1.8 mole) | 60 |
| TPA | 99.7 g (0.6 mole) | 20 |
| ClDP | 114.8 g (0.45 mole) | 15 |
| DP | 27.9 g (0.15 mole) | 5 |
| EA | 321.6 g (3.15 mole) | |

Differences relative to Example 1: reaction time without vacuum was 165 minutes, vacuum-condensation time was 135 minutes (down to 1 torr), final temperature 323° C., $\eta_{inh}$ 6.3 dl/g.

| COMPARISON EXAMPLE 1: | | |
|---|---|---|
| | | MR |
| PHB | 124.4 g (0.9 mole) | 60 |
| TPA | 49.8 g (0.3 mole) | 20 |
| DP | 55.9 g (0.3 mole) | 20 |
| EA | 160.8 g (1.57 mole) | |

The reaction was carried out in a manner similar to that of Example 1, but without vacuum condensation. After a distillation yield of 96%, the polymer was already in solid form at a final temperature of 380° C.

$\eta_{inh}$=1.0 dl/g, polymer melting range 400° to 410° C.

| EXAMPLE 5: | | |
|---|---|---|
| | | MR |
| PHB | 248.8 g (1.8 mole) | 60 |
| TPA | 79.7 g (0.48 mole) | 16 |
| IPA | 19.9 g (0.12 mole) | 4 |
| ClDP | 23.0 g (0.09 mole) | 3 |
| DP | 97.8 g (0.525 mole) | 17 |
| EA | 321.6 g | |

Catalyst: 20 mg of iron(II) acetate

Mode of operation analogous to that of Example 1.

95% of the theoretical quantity of acetic acid was distilled off within 2 hours, and a further 4% was distilled off within 17 minute at a vacuum of 2 torr and a final temperature of 350° C. A metallically lustrous, stringy, viscous polymer mass with an inherent viscosity of 5.5 dl/g was obtained, which was injection-molded at 360° C. to obtain test plates with smooth surfaces (Tables 1 and 2).

| EXAMPLE 6: | | |
|---|---|---|
| | | MR |
| PHB | 248.8 g (1.8 mole) | 60 |
| TPA | 79.9 g (0.48 mole) | 16 |
| IPA | 19.9 g (0.12 mole) | 4 |
| ClDP raw product | 38.3 g (0.15 mole) | 5 |
| DP | 83.8 g (0.45 mole) | 15 |
| EA | 321.6 g | |

The procedure for condensation was as described in Example 1.

A value of 340° C. was adjusted as the upper temperature limit for the polycondensation.

The inherent viscosity of the polymer was 5.8 dl/g.

| EXAMPLE 7: | | |
|---|---|---|
| | | MR |
| PHB | 248.7 g (1.8 mole) | 60 |
| TPA | 79.9 g (0.48 mole) | 16 |
| IPA | 19.9 g (0.12 mole) | 4 |
| ClDP | 76.6 g (0.3 mole) | 10 |
| DP | 58.7 g (0.315 mole) | 10 |
| EA | 321.6 g | |

The condensation was effected in a manner analogous to that of Example 1, but with a maximum internal temperature of 307° C. The vacuum-condensation phase was extended to 3 hours. A very viscous polymer mass with an inherent viscosity of 6.4 dl/g was obtained.

| EXAMPLE 8: | | |
|---|---|---|
| | | MR |
| PHB | 248.7 g | 60 |
| TPA | 79.9 g | 16 |
| IPA | 19.9 g | 4 |
| ClDP | 114.8 g | 15 |
| DP | 27.9 g | 5 |
| EA | 321.6 g | |

Catalyst: 20 mg of iron(II) acetate

The procedure was the same as that described under Example 1. The vacuum-condensation phase lasted 1.5 hours at 2 to 4 torr, and the temperature of the polymer mass at the end of condensation was 323° C. $\eta_{inh}$=5.3 dl/g. By post-heating of the ground, wood-chip-like material at 250° C. for 27 hours, $\eta_{inh}$ increased to 6.4 dl/g. The polymer was processed by injection molding at 340° C. (mold temperature 25° C.) to obtain test pieces (see Tables 1 and 2).

| EXAMPLE 9: | | |
|---|---|---|
| | | MR |
| PHB | 248.7 g (1.8 mole) | 60 |
| TPA | 80.0 g (0.48 mole) | 16 |
| IPA | 19.9 g (0.12 mole) | 4 |
| ClDP | 114.8 g (0.45 mole) | 45 |
| Hydroquinone | 24.8 g (0.225 mole) | 15 |
| EA | 321.6 g (3.15 mole) | |

Catalyst: 20 mg of Fe(II) acetate.

The procedure was analogous to that of Example 1, with a maximum condensation temperature of 317° C. The metallically lustrous, stringy polymer melt had an inherent viscosity of 3.4 dl/g. The polymer was processed by injection molding at 320° C. (mold temperature 25° C.) to obtain test pieces (see Tables 1 and 2).

| COMPARISON EXAMPLE 2 WITHOUT DClP: | | |
|---|---|---|
| | | MR |
| PHB | 248.8 g (1.8 mole) | 60 |
| TPA | 79.7 g (0.28 mole) | 16 |
| IPA | 19.9 g (0.12 mole) | 4 |
| DP | 112.8 g (0.606 mole) | 20 |
| EA | 321.6 g (3.15 mole) | |

The procedure was the same as that described in Example 1.

Differences: distillation phase without vacuum was 1.5 hours, vacuum distillation was 8 minutes, final temperature was 398° C.

The obtained polymer mass had an inherent viscosity of 6.0 dl/g. The melting point measured on a heating plate was between 390° and 400° C. For processing by injection molding, cylinder temperatures of 390° C. were necessary.

| EXAMPLE 10: | | |
|---|---|---|
| The following mixture was polycondensed in a manner analogous to that of Example 1: | | |
| | | MR |
| PHB | 248.8 g (1.8 mole) | 60 |
| TPA | 79.9 g (0.48 mole) | 16 |
| IPA | 19.8 g (0.12 mole) | 4 |
| ClDP | 122.4 g (0.48 mole) | 16 |
| HQ | 14.4 g (0.132 mole) | 4 (plus excess) |

-continued

EXAMPLE 10:
The following mixture was polycondensed in a manner analogous to that of Example 1:

| | | MR |
|---|---|---|
| EA | 346.2 g | |

Catalyst: 1.5 g of Na$_3$PO$_4$ × 12H$_2$O

The total condensation time was 2 hours and 20 minutes (vacuum condensation), and the final temperature of the polymer mass was 332° C. In total, 380 ml of distillate was obtained, corresponding to a conversion of 99.7%.

The measured melting range of the liquid-crystalline copolyester was 275° to 285° C., and a value of 4.7 dl/g was measured as the inherent solution viscosity.

EXAMPLE 11:
| PHB | 82.8 g (0.62 mole) |
|---|---|
| TPA | 33.2 g (0.20 mole) |
| ClDP | 40.8 g (0.16 mole) |
| RC | 4.8 g (0.044 mole) |
| EA | 130.4 g (1.13 mole) |

As the catalyst, 0.5 g of Na$_3$PO$_4$xH$_2$O) was used. After a total condensation time of 2 hours and 20 minutes (30 minutes vacuum condensation), the polycondensation was stopped at a temperature of 340° C. and a conversion of 99%, as calculated from the quantity of distilled acetic acid. A metallically lustrous, viscous polymer mass was obtained, from which it was possible to draw filaments.

The inherent viscosity was 4.3 dl/g.

TABLE 1
Composition and thermal properties

| | Composition in mole % | | | | DP or | Melting range | Vicat B |
|---|---|---|---|---|---|---|---|
| Example | PHB | TPA | IPA | ClDP | other | (°C.) | (°C.) |
| 1 | 60 | 20 | — | 3 | 17 | 380–390 | 250 |
| 2 | 60 | 20 | — | 5 | 15 | 370–380 | 234 |
| 3 | 60 | 20 | — | 10 | 10 | 330–340 | 192 |
| 4 | 60 | 20 | — | 15 | 5 | 300–310 | — |
| Comp. 1 | 60 | 20 | — | — | 20 | 400–410 | — |
| 5 | 60 | 16 | 4 | 3 | 17 | 350–360 | 216 |
| 6 | 60 | 16 | 4 | 5 | 15 | 330–340 | 194 |
| 7 | 60 | 16 | 4 | 10 | 10 | 280–290 | — |
| 8 | 60 | 16 | 4 | 15 | 5 | 260–270 | 180 |
| 9 | 60 | 16 | 4 | 15 | 5 HQ | 280–290 | 198 |
| Comp. 2 | 60 | 16 | 4 | 0 | 20 | 390–400 | 2 |

TABLE 2
Mechanical properties

| Example | Flexural strength $\delta_{bB}$(MPa) | Flexural modulus $E_b$ (GPa) | Notch impact toughness $a_k$ (kJ/m$^2$ kN/m) |
|---|---|---|---|
| 1 | 145 | 9.5 | 22.9 |
| 2 | 150 | 13.3 | 13 |
| 3 | 178 | 11.6 | 13.5 |
| 4 | 183 | 13.3 | 27.9 |
| 5 | 147 | 10.2 | 21 |
| 6 | 157 | 10.7 | 19.0 |
| 7 | 257 | 12.4 | 25.9 |
| 8 | 207 | 13.2 | 20 |
| 9 | 188 | 9.5 | 10 |
| Comp. 2 | 106 | 8.2 | — |

What is claimed is:

1. A melt-processable, thermotropic, fully aromatic polyesters, consisting essentially of
   (a) repeating units of the formula

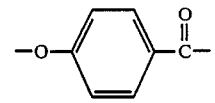

in proportions of 20 to 70 mole percent,
   (b) units of the formula

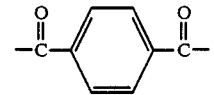

in proportions of 10 to 40 mole percent,
   (c) one or both, units of the formula

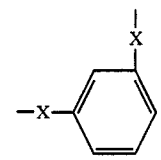

wherein X=C=O or —O—, in proportions of 0 to 15 mole percent,
   (d) units of at least one of formulas

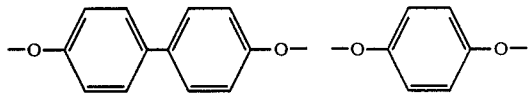

in proportions of 0 to 33 mole percent, and
   (e) units of the formula

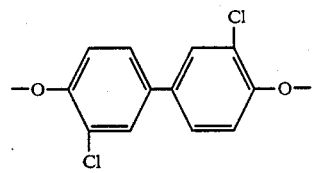

in proportions of 2 to 40 mole percent.

2. A polyester according to claim 1, wherein said polyester consists of the condensed group (a) in proportions of 40 to 60 mole percent, of the condensed group (b) in proportions of 15 to 20 mole percent, of at least one of the condensed groups (c) in proportions of 4 to 6 mole percent, of at least one of the condensed groups (d) in proportions of 5 to 17 mole percent, and of the condensed group (e) in proportions of 3 to 15 mole percent.

3. A process for synthesis of the polyester according to claim 1, comprising reacting a C$_1$ to C$_4$ acyl derivative of (a) p-hydroxybenzoic acid, (b) at least one member selected from the group consisting of 4,4'-dihydroxydiphenyl and hydroquinone, and (c) 3,3'-dichloro-4,4'-dihydroxydiphenyl with terephthalic acid at temperatures of 250° to 385° C.

4. The process of claim 3, wherein resorcinol is also reacted with said terephthalic acid.

5. The process of claim 3, wherein isophthalic acid is also reacted with said acyl derivative.

6. The process of claim 3, wherein said reaction is carried out under reduced pressure.

7. The process of claim 3, wherein said reaction is carried out in the presence of at least one chain-terminating agent.

8. The process of claim 3, wherein said reaction is carried out in the presence of at least one catalyst.

9. The process of claim 3, wherein an acetate of a phenolic compound is reacted with terephthalic acid.

10. The process of claim 9, wherein said acetate is also reacted with isophthalic acid.

11. The process of claim 3, further comprising effecting a solid-phase post-condensation subsequent to said reaction.

12. The polyester of claim 1 wherein said polyester has a Vicat B softening temperature range of from 150° to 250° C.

13. A molding prepared from the polyester of claim 1 wherein said molding has a minimum notch impact toughness of 10 kn/m, a minimum flexural modulus of 10 GPa, and a minimum flexural strength of 100 MPa.

* * * * *

UNITED STATES PATENT AND TRADEMARK OFFICE
CERTIFICATE OF CORRECTION

PATENT NO. : 4,841,014
DATED : June 20, 1989
INVENTOR(S) : Walter BRODOWSKI

It is certified that error appears in the above-identified patent and that said Letters Patent is hereby corrected as shown below:

Col. 4, line 3, change "slats" to --salts--.

Col. 5, line 55, change "EXAMPLE 1" to --EXAMPLE 1:--.

Col. 7, line 31, change "minute" to --minutes--; line 63, after the table, insert --Catalyst: 20 mg of iron (II) acetate--.

Col. 8, lines 65-69, relocate column of numbers under heading "MR".

Signed and Sealed this

Seventeenth Day of April, 1990

Attest:

HARRY F. MANBECK, JR.

*Attesting Officer*   *Commissioner of Patents and Trademarks*